United States Patent
Elder et al.

(10) Patent No.: US 7,257,569 B2
(45) Date of Patent: Aug. 14, 2007

(54) SYSTEM AND METHOD FOR DETERMINING COMMUNITY OVERLAP

(75) Inventors: Michael D. Elder, Greer, SC (US);
Jason Y. Jho, Raleigh, NC (US);
Vaughn T. Rokosz, Newton, MA (US);
Andrew L. Schirmer, Andover, MA (US); Matthew Schultz, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 10/286,145

(22) Filed: Oct. 31, 2002

(65) Prior Publication Data

US 2004/0088312 A1    May 6, 2004

(51) Int. Cl.
*G06F 17/30* (2006.01)
(52) U.S. Cl. ............... 707/3; 707/1; 707/6; 707/9; 707/10
(58) Field of Classification Search .......... 707/1–10, 707/100–104.1, 200–206; 715/501.1, 501; 709/202–206, 224; 706/12.1; 382/209; 703/6; 705/26, 8; 395/733, 349; 364/401, 364/419; 704/9
See application file for complete search history.

(56) References Cited

U.S. PATENT DOCUMENTS

| | | | |
|---|---|---|---|
| 4,908,761 A | 3/1990 | Tai ............................. | 364/401 |
| 5,371,673 A | 12/1994 | Fan ........................ | 364/419.01 |
| 5,745,113 A | 4/1998 | Jordan et al. ............... | 345/349 |
| 5,933,818 A | 8/1999 | Kasravi et al. .............. | 706/12 |
| 6,006,223 A | 12/1999 | Agrawa et al. ................ | 707/5 |
| 6,018,734 A | 1/2000 | Zhang et al. .................. | 707/3 |
| 6,070,143 A | 5/2000 | Barney et al. ................. | 705/8 |
| 6,115,718 A | 9/2000 | Huberman et al. ......... | 707/102 |
| 6,138,128 A | 10/2000 | Perkowitz et al. ....... | 715/501.1 |
| 6,148,294 A | 11/2000 | Beyda et al. .................. | 707/1 |
| 6,177,932 B1 | 1/2001 | Galdes et al. ............... | 345/733 |
| 6,182,067 B1 | 1/2001 | Presnell et al. ................ | 707/5 |
| 6,195,657 B1 | 2/2001 | Rucker et al. ................. | 707/5 |
| 6,199,067 B1 | 3/2001 | Geller ......................... | 707/10 |
| 6,212,494 B1 | 4/2001 | Boguraev ...................... | 704/9 |
| 6,216,098 B1 | 4/2001 | Clancy et al. ................. | 703/6 |

(Continued)

FOREIGN PATENT DOCUMENTS

JP    2001119403 A    4/2001

(Continued)

OTHER PUBLICATIONS

Brouillette, S. M. and J. P. Lavelle. *A Methodology for Mapping and Analyzing Community Social Services as a System.* Norcross, 6th Industrial Engineering Research Conference Proceedings. Miami Beach, May 17-18, 1997. Institute of Industrial Engineers, Norcross, GA, 1997. 662-667.

(Continued)

*Primary Examiner*—Yicun Wu

(57) ABSTRACT

A system and method for evaluating an information aggregate. A metrics database stores document indicia including document attributes and associated person. A query engine responsive to a user request and the metrics database aggregates documents having same, unique attributes in a plurality of information aggregates, and determines the intersections of said information aggregates. A visualization engine displays these intersections selectively with reference to people, documents, usage patterns or categories.

9 Claims, 10 Drawing Sheets

U.S. PATENT DOCUMENTS

| | | | |
|---|---|---|---|
| 6,233,583 B1 | 5/2001 | Hoth | 707/102 |
| 6,236,987 B1* | 5/2001 | Horowitz et al. | 707/3 |
| 6,249,779 B1 | 6/2001 | Hitt | 706/1 |
| 6,266,649 B1 | 7/2001 | Linden et al. | 705/26 |
| 6,275,820 B1 | 8/2001 | Navin-Chandra et al. | 707/3 |
| 6,334,127 B1 | 12/2001 | Bieganski et al. | 707/5 |
| 6,363,174 B1 | 3/2002 | Lu | 382/209 |
| 6,742,032 B1* | 5/2004 | Castellani et al. | 709/224 |
| 6,820,094 B1* | 11/2004 | Ferguson et al. | 707/200 |
| 2002/0035593 A1 | 3/2002 | Salim et al. | 709/202 |
| 2002/0116466 A1* | 8/2002 | Trevithick et al. | 709/206 |
| 2003/0050977 A1* | 3/2003 | Puthenkulam et al. | 709/204 |

FOREIGN PATENT DOCUMENTS

| | | |
|---|---|---|
| WO | WO 0137162 A2 | 5/2001 |
| WO | WO0201455 A2 | 2/2002 |

OTHER PUBLICATIONS

Sack, W. *Diagrams of Social Cohesion*. Association for Computational Linguistics, U of Maryland. MIT Media Laboratory, Jun. 1999. 3 plus 8 pages.

Kautz, H., B. Selman, M. Shah.. *Referral Web: Combining Social Networks and Collaborative Filtering*. Communications of the ACM, vol. 40, No. 3, Mar. 1997.

Schwartz, M. F., D. C. M. Wood. *Discovering shared interests using graph analysis*. Communications of the ACM, v. 36 n. 8 Aug. 1993, 78-89.

Wellman, B. *For a social network analysis of computer networks: a socialogical perspective on collaborative work and virtual community*. Proceedings of the 1996 conference on ACM SIGCPR/SIGMIS. 1-11.

Qureshi, S. *Supporting electronic groupprocesses: a social perspective*. Proceedings of the 1995 ACM SIGCPR Conference on Supporting teams, groups, and learning inside the IS function. ACM Press. 24-34.

Ackerman, M.S., B. Starr. *Social activity indicators: interface components for CSCW systems*. Proceedings of the 8th ACM Symposium on User Interface and Software Technology. ACM Press. 159-168. Nov. 14-17, 1995.

Garton, L., C. Haythornthwaite, B. Wellman. *Studying on-line social networks* in Doing Internet Research, edited by Steve Jones, Thousand Oaks, CA: Sage, 1999.

Srivastava, Jaidepp, Robert Cooley, Mukund Deshpande, Pang-Ning Tan. *Web Usage Mining: Discovery and Applications of Usage Patterns from Web Data*. SIGKDD Explorations, vol. 1, Issue 2, Jan. 2000. 12-23.

Wang, Y. *Web Mining and Knowledge Discovery of Usage Patterns*. CS748T Project (Part I) Feb. 2000.

* cited by examiner

XML FORMAT FOR SQL QUERIES

QRML STRUCTURE

|  | 100 | 102 | 104 | 106 |
|---|---|---|---|---|
|  | PEOPLE | COMMUNITY | SYSTEM | CATEGORY |

ACCELERATION RATES

COMMUNITY AFFINITIES

☐ DOCUMENT VIEWS
📁 OVERLAP VIEWS

─300

SELECT METRIC TYPE

○ DOCUMENTS
◉ 310 CATEGORIES
○ PEOPLE ─302

SELECT COMMUNITIES

☐ WORKFLOW AT LOTUS
☐ WORKFLOW AND DOCUMENT MANAGEMENT
☑ PORTALS AT LOTUS
☑ LDS
☐ DOCUMENT MANAGEMENT AT LOTUS

304
[VISUALIZE]

[COMMON CATEGORIES FOR PORTALS AT LOTUS, LDS]
** THE COMMON CATEGORIES THAT INTERSECT COMMUNITIES: PORTALS AT LOTUS, LDS

HOME>CROSS-PRODUCT>BROWSERS   306
HOME>CROSS-PRODUCT>BUILDS
HOME>CROSS-PRODUCT>INSTALLATION
HOME>CROSS-PRODUCT>QUICKPLACE
HOME>CROSS-PRODUCT>RELEASE NOTES
HOME>CROSS-PRODUCT>SECURITY
HOME>DISCOVERY SERVER>BUILDS
HOME>DISCOVERY SERVER>DESIGN PARTNER PROGRAM>TEST BUILDS
HOME>DISCOVERY SERVER>METRICS
HOME>DISCOVERY SERVER>PROJECT MANAGEMENT>LDS QE
HOME>DISCOVERY SERVER>PROJECT MANAGEMENT>MEETING
HOME>DISCOVERY SERVER>SECURITY
HOME>DISCOVERY SERVER>SPIDERS
HOME>DISCOVERY SERVER>TAXONOMY
HOME>DISCOVERY SERVER>UI DESIGN
HOME>DOMINO WORKFLOW>QUASAR
HOME>DOMINO WORKFLOW>QUASAR>GENERAL
HOME>DOMINO WORKFLOW>WF RELEASE NOTES>BUILDS
HOME>DOMINO WORKFLOW>WORKFLOW GENERAL
HOME>DOMINO WORKFLOW>WORKFLOW PROJECT MANAGEMENT
HOME>DOMINO WORKFLOW>WORKFLOW REQUIREMENTS
HOME>DOMINO.DOC>DEVELOPMENT>OBJECT MODELS
HOME>DOMINO.DOC>LINKING SYSTEM>REQUIREMENTS
HOME>INDUSTRY NEWS AND ANALYSIS>KNOWLEDGE MANAGEMENT>LDS (RAVEN)

FIG. 12

SYSTEM AND METHOD FOR
DETERMINING COMMUNITY OVERLAP

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 10/286,211 filed 31 Oct. 2002 for "SYSTEM AND METHOD FOR DETERMINING FOUNDERS OF AN INFORMATION AGGREGATE";

Ser. No. 10/286,263, filed 31 Oct. 2002 for "SYSTEM AND METHOD FOR FINDING THE ACCELERATION OF AN INFORMATION AGGREGATE";

Ser. No. 10/286,262, filed 31 Oct. 2002 for "SYSTEM AND METHOD FOR FINDING THE RECENCY OF AN INFORMATION AGGREGATE";

Ser. No. 10/286,261, filed 31 Oct. 2002 for "SYSTEM AND METHOD FOR EXAMINING THE AGING OF AN INFORMATION AGGREGATE";

Ser. No. 10/286,212, filed 31 Oct. 2002 for "SYSTEM AND METHOD FOR DETERMINING CONNECTIONS BETWEEN INFORMATION AGGREGATES";

Ser. No. 10/286,237, filed 31 Oct. 2002 for "SYSTEM AND METHOD FOR DETERMINING MEMBERSHIP OF INFORMATION AGGREGATES";

Ser. No. 10/286,508, filed 31 Oct. 2002 for "SYSTEM AND METHOD FOR EVALUATING INFORMATION AGGREGATES BY VISUALIZING ASSOCIATED CATEGORIES";

Ser. No. 10/285,799, filed 31 Oct. 2002 for "SYSTEM AND METHOD FOR BUILDING SOCIAL NETWORKS BASED ON ACTIVITY AROUND SHARED VIRTUAL OBJECTS"; and Ser. No. 10/286,534, filed 31 Oct. 2002 for "SYSTEM AND METHOD FOR ANALYZING USAGE PATTERNS IN INFORMATION AGGREGATES".

BACKGROUND OF THE INVENTION

1. Technical Field of the Invention

This invention relates to a method and system for analyzing trends in an information aggregate. More particularly, it relates to identifying and visualizing the intersections (or overlaps) between information aggregates.

2. Background Art

Existing systems for knowledge management are focused primarily on individuals and the documents they create. Such systems typically organize documents along two primary dimensions, as follows:

1. A physical dimension that reflects a fundamental unit of storage in the underlying system. Examples of physical units of storage include a Notes database (NSF) or a QuickPlace.
2. A topical dimension that collects documents together based on their content or expected usage. Examples of the logical dimension include categories (to group documents that are concerned with a particular topic) or collections (to group documents that are serving a particular purpose).

The user interfaces in existing information systems are therefore concerned with displaying information along these two dimensions. Search interfaces, for example, often allow a search to be defined based on both the physical and topical dimensions, and of course are focused on returning documents. This approach is useful, but it fails to account for the fact that most work of consequence happens in teams and not at the level of individuals. There is therefore a need to better align information systems with the way people really work by presenting information in terms of groups (for example, teams or communities).

The Lotus Discovery Server (LDS) is a Knowledge Management (KM) tool that allows users to more rapidly locate the people and information they need to answer their questions. It categorizes information from many different sources (referred to generally as knowledge repositories) and provides a coherent entry point for a user seeking information. Moreover, as users interact with LDS and the knowledge repositories that it manages, LDS can learn what the users of the system consider important by observing how users interact with knowledge resources. Thus, it becomes easier for users to quickly locate relevant information.

The focus of LDS is to provide specific knowledge or answers to localized inquiries; focusing users on the documents, categories, and people who can answer their questions. There is a need, however, to use the information that LDS collects from observing the users to discover and quantify relationships that may exist between arbitrary aggregates of information, such as document collections.

It is, therefore, an object of the invention to provide an improved system and method for evaluating relationships between information aggregates.

SUMMARY OF THE INVENTION

A system and method for evaluating an information aggregate by collecting a plurality of documents having non-unique values on a first shared attribute into a first information aggregate; collecting a plurality of documents having non-unique values on a second shared attribute into a second information aggregate; and determining and visualizing intersections of the first and second information aggregates.

In accordance with an aspect of the invention, there is provided a computer program product configured to be operable to evaluate information aggregates by determining and visualizing people, usage pattern, and category intersections.

Other features and advantages of this invention will become apparent from the following detailed description of the presently preferred embodiment of the invention, taken in conjunction with the accompanying drawings.

BRIEF DESCRIPTION OF THE DRAWINGS

FIG. 12 is a diagrammatic illustration of a visualization of community intersection with respect to categories.

DETAILED DESCRIPTION OF PREFERRED EMBODIMENTS

Figure 1:
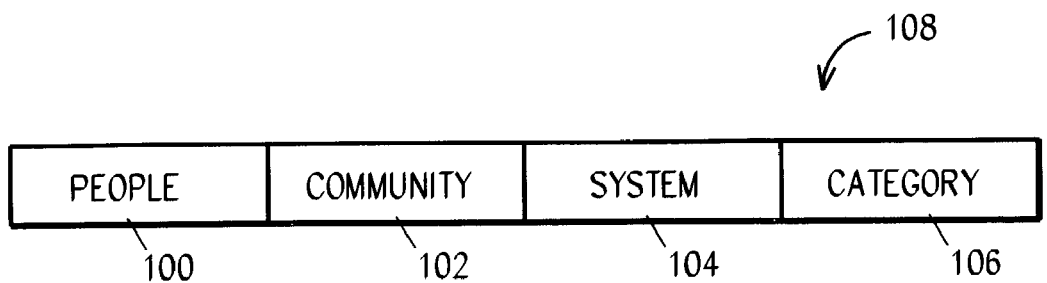
FIG. 1 is a diagrammatic representation of visualization portfolio strategically partitioned into four distinct domains in accordance with the preferred embodiment of the invention.

According to the preferred embodiment of the system and method of the invention, an aggregate-oriented way of presenting information is provided. In an exemplary embodiment, the amount of overlap between two specified communities is determined and displayed. While this exemplary embodiment focuses on communities, the system and method of the invention can be applied more generally to any set of information aggregates.

The Lotus Discovery Server (LDS) is a Knowledge Management (KM) tool that allows users to more rapidly locate the people and information they need to answer their questions. In an exemplary embodiment of the present invention, the functionality of the Lotus Discovery Server (LDS) is extended to include useful visualizations that identify and quantify relationships between information aggregates.

On its lowest level, LDS manages knowledge resources. A knowledge resources is any form of document that contains knowledge or information. Examples include Lotus WordPro Documents, Microsoft Word Documents, webpages, postings to newsgroups, etc. Knowledge resources are typically stored within knowledge repositories—such as Domino.Doc databases, websites, newsgroups, etc.

When LDS is first installed, an Automated Taxonomy Generator (ATG) subcomponent builds a hierarchy of the knowledge resources stored in the knowledge repositories specified by the user. For instance, documents about working with XML documents in the Java programming language stored in a Domino.Doc database might be grouped into a category named 'Home>Development>Java>XML'. This categorization will not move or modify the document, just record its location in the hierarchy. The hierarchy can be manually adjusted and tweaked as needed once initially created.

A category is a collection of knowledge resources and other subcategories of similar content. Categories represent a more abstract re-organization of the contents of physical repositories, without displacing the available knowledge resources. For instance, in the following hierarchy:

Home (Root of the hierarchy)
  Animals
    Dogs
    Cats
  Industry News and Analysis
    CNN
    ABC News
    MSNBC 'Home>Animals', 'Home>Industry News and Analysis', and 'Home>Industry News and Analysis>CNN' are each categories that can contain knowledge resources and other subcategories. Furthermore, 'Home>Industry News and Analysis>CNN' might contain documents from www.cnn.com and documents created by users about CNN articles which are themselves stored in a Domino.Doc database.

Knowledge repositories are then grouped into sets, known as communities. A community is a set of repositories primarily utilized by some particular group of people. Communities are only defined by administrative users of the system (unlike categories which can be created by LDS and then modified). If a user interacts with one of the repositories used to define Community A, then he is considered an active participant in that community. Thus, communities represent the physical storage of knowledge resources and provide a mechanism for LDS to observe the activity of a group of people.

As a user interacts with knowledge resources, LDS learns which categories they interact with the most. LDS maintains a score for the user, known as an affinity. An affinity is a rank that numerically captures how often a user interacts with a particular category compared to the level of interaction of other users. Affinities within the system are important in relation to the other affinities. Once a user's affinity reaches a certain threshold, LDS asks the user if he would like to publish that affinity. These affinities can then be made public, so that when other users search on a topic, LDS can identify users who are knowledgeable on that topic.

These affinities are extremely useful in making inferences about the interests of the users of the system, and in understanding the knowledge trends. In accordance with the present invention, affinities are used to reflect when a particular category (or topic of information) becomes more important than others, indicating that the organization is losing or gaining interest in some topic.

LDS maintains a score for the knowledge resources which are utilized to indicate how important they are to the users of the system. For instance, a document that has a lot of activity around it—such as responses, modifications or simply a high access rate—is perceived as more important than documents which are rarely accessed. This is generically referred to as 'document value'.

Another capability of LDS is its search functionality. Instead of returning only the knowledge resources (documents) that a standard web-based search engine might locate, LDS also returns the categories that the topic might be found within and the people that are most knowledge about that topic. LDS takes the users' affinities and the document values it has calculated into account when returning the results of a search. Thus, users with high affinities for a particular topic and documents that are rated with a higher document value are more likely to be returned. The present invention is unrelated to utilizing or extending this kind of localized searching functionality, but rather magnifies the larger trends within the system on a more general level.

The system and method of the preferred embodiments of the invention are built on a framework that collectively integrates data-mining, user-interface, visualization, and server-side technologies. An extensible architecture provides a layered process of transforming data sources into a state that can be interpreted and outputted by visualization components. This architecture is implemented through Java, Servlets, JSP, SQL, XML, and XSLT technology, and essentially adheres to a model-view controller paradigm, where interface and implementation components are separated. This allows effective data management and server side matters such as connection pooling to be independent In accordance with the preferred embodiment of the invention, information visualization techniques are implemented through the three main elements including bar charts, pie charts, and tables.

Referring to FIG. 1, a visualization portfolio is strategically partitioned into four distinct domains, or explorers: people 100, community 102, system 104, and category 106. The purpose of these partitioned explorers 100-106 is to provide meaningful context for the visualizations. The raw usage pattern metrics produced from the Lotus Discovery Server (LDS) do not raise any significant value unless there is an applied context to it. In order to shed light on the hidden relationships behind the process of knowledge creation and maintenance, there is a need to ask many important questions. Who are the knowledge creators? Who are the ones receiving knowledge? What group of people are targeted as field experts? How are groups communicating with each other? Which categories of information are thriving or lacking activity? How is knowledge transforming through time? While answering many of these questions, four key targeted domains, or explorer types 100-106 are identified, and form the navigational strategy for user interface 108. This way, users can infer meaningful knowledge trends and dynamics that are context specific.

People Domain 100

People explorer 100 focuses on social networking, community connection analysis, category leaders, and affinity analysis. The primary visualization component is table listings and associations.

Community Domain 102

Community explorer 102 focuses on acceleration, associations, affinity analysis, and document analysis for Lotus K-Station communities. The primary visualization components are bar charts and table listings. Features include drill down options to view associated categories, top documents, and top contributors.

System Domain 104

System explorer 104 focuses on high level activity views such as authors, searches, accesses, opens, and responses for documents. The primary visualization components are bar charts (grouped and stacked). Features include zooming and scrollable regions.

Category Domain 106

Category explorer 106 focuses on life span, acceleration, affinity analysis, and document analysis of categories generated by a Lotus Discovery Server's Automated Taxonomy Generator. The primary visualization components are bar charts. Features include drill down options to view subcategories, top documents, top contributors, category founders, and document activity.

System Overview

Figure 2:
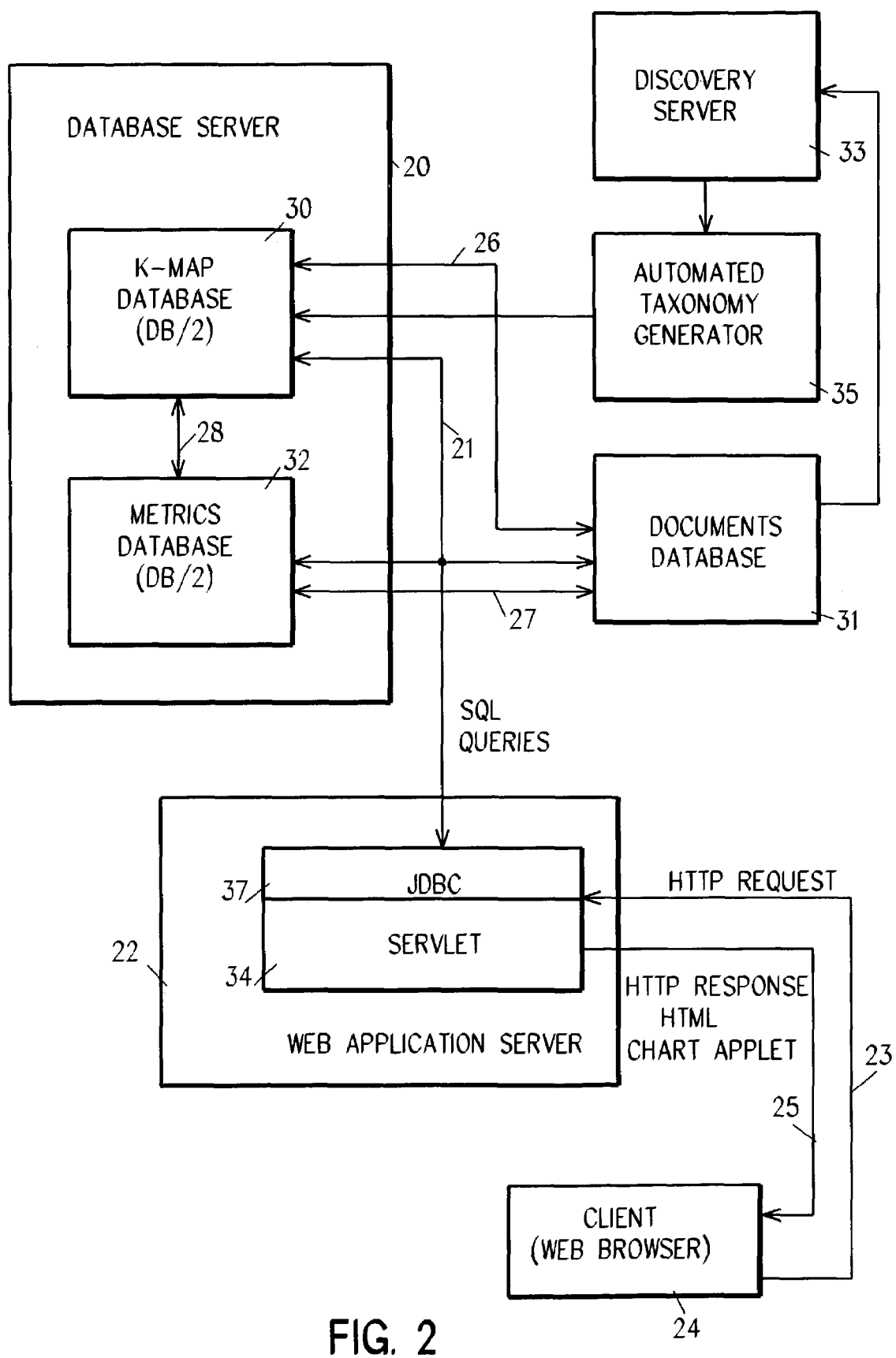
FIG. 2 is a system diagram illustrating a client/server system in accordance with the preferred embodiment of the invention.

Referring to FIG. 2, an exemplary client/server system is illustrated, including database server 20, discovery server 33, automated taxonomy generator 35, web application server 22, and client browser 24.

Knowledge management is defined as a discipline to systematically leverage information and expertise to improve organizational responsiveness, innovation, competency, and efficiency. Discovery server 33 (e.g., Lotus Discovery Server) is a knowledge system which may deployed across one or more servers. Discovery server 33 integrates code from several sources (e.g., Domino, DB2, InXight, KeyView and Sametime) to collect, analyze and identify relationships between documents, people, and topics across an organization. Discovery server 33 may store this information in a data store 31 and may present the information for browse/query through a web interface referred to as a knowledge map (e.g., K-map) 30. Discovery server 33 regularly updates knowledge map 30 by tracking data content, user expertise, and user activity which it gathers from various sources (e.g. Lotus Notes databases, web sites, file systems, etc.) using spiders.

Database server 20 includes knowledge map database 30 for storing a hierarchy or directory structure which is generated by automated taxonomy generator 35, and metrics database 32 for storing a collection of attributes of documents stored in documents database 31 which are useful for forming visualizations of information aggregates. The k-map database 30, the documents database 31, and the metrics database are directly linked by a key structure represented by lines 26, 27 and 28. A taxonomy is a generic term used to describe a classification scheme, or a way to organize and present information, Knowledge map 30 is a taxonomy, which is a hierarchical representation of content organized by a suitable builder process (e.g., generator 35).

A spider is a process used by discovery server 33 to extract information from data repositories. A data repository (e.g. database 31) is defined as any source of information that can be spidered by a discovery server 33.

Java Database Connectivity API (JDBC) 37 is used by servlet 34 to issue Structured Query Language (SQL) queries against databases 30, 31, 32 to extract data that is relevant to a users request 23 as specified in a request parameter which is used to filter data. Documents database 31 is a storage of documents in, for example, a Domino database or DB2 relational database.

The automated taxonomy generator (ATG) 35 is a program that implements an expectation maximization algorithm to construct a hierarchy of documents in knowledge map (K-map) metrics database 32, and receives SQL queries on link 21 from web application server 22, which includes servlet 34. Servlet 34 receives HTTP requests on line 23 from client 24, queries database server 20 on line 21, and provides HTTP responses, HTML and chart applets back to client 24 on line 25.

Discovery server 33, database server 20 and related components are further described in U.S. patent application Ser. No. 10,044,914 filed 15 Jan. 2002 for System and Method for Implementing a Metrics Engine for Tracking Relationships Over Time.

Figure 3:
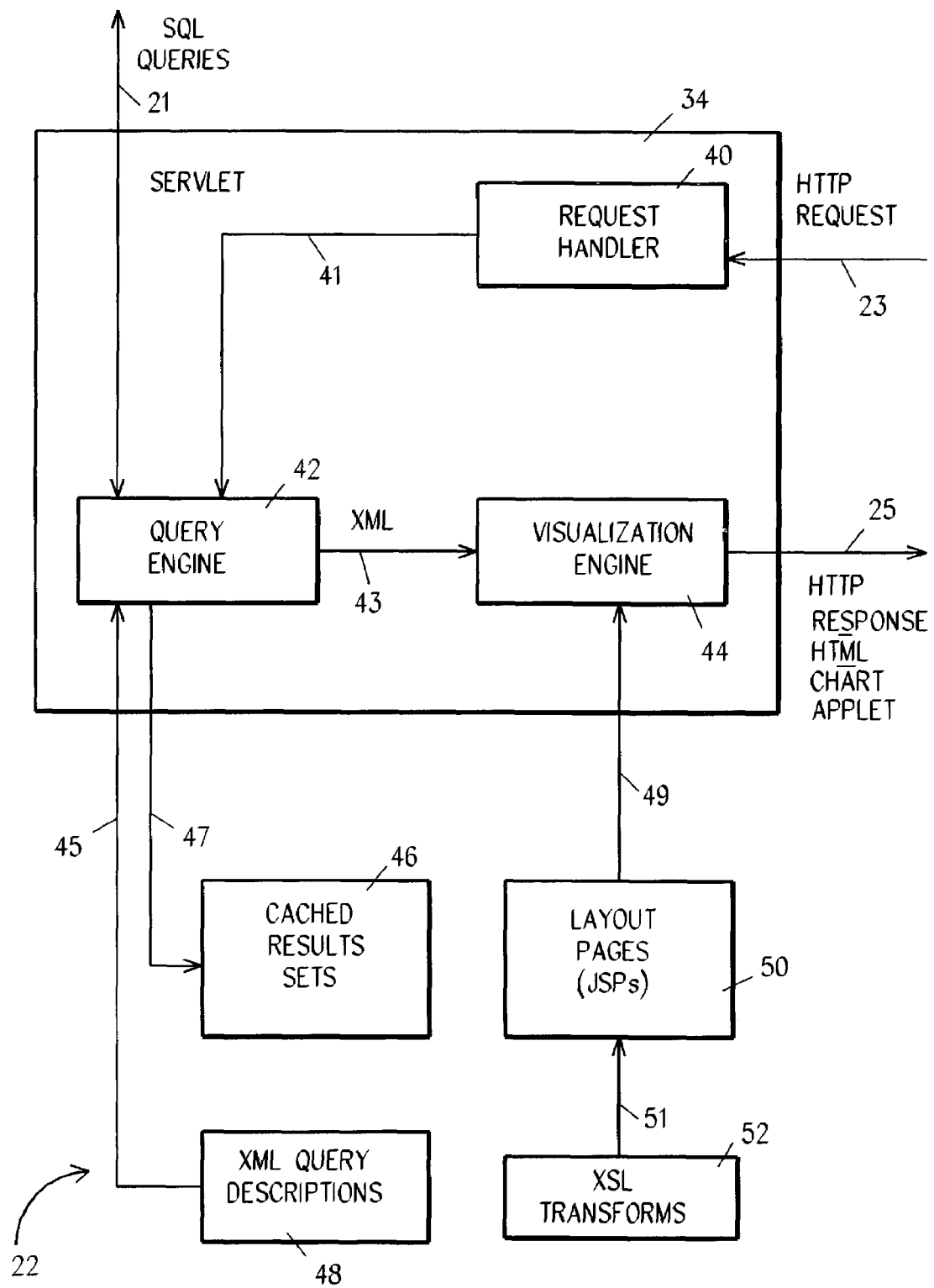
FIG. 3 is a system diagram further describing the web application server of FIG. 2.

Referring to FIG. 3, web application server 22 is further described. Servlet 34 includes request handler 40 for receiving HTTP requests on line 23, query engine 42 for generating SQL queries on line 21 to database server 20 and result set XML responses on line 43 to visualization engine 44. Visualization engine 44, selectively responsive to XML 43 and layout pages (JSPS) 50 on line 49, provides on line 25 HTTP responses, HTML, and chart applets back to client 24. Query engine 42 receives XML query descriptions 48 on line 45 and caches and accesses results sets 46 via line 47. Layout pages 50 reference XSL transforms 52 over line 51.

In accordance with the preferred embodiment of the invention, visualizations are constructed from data sources 32 that contain the metrics produced by a Lotus Discovery Server. The data source 32, which may be stored in an IBM DB2 database, is extracted through tightly coupled Java and XML processing.

Figure 4:
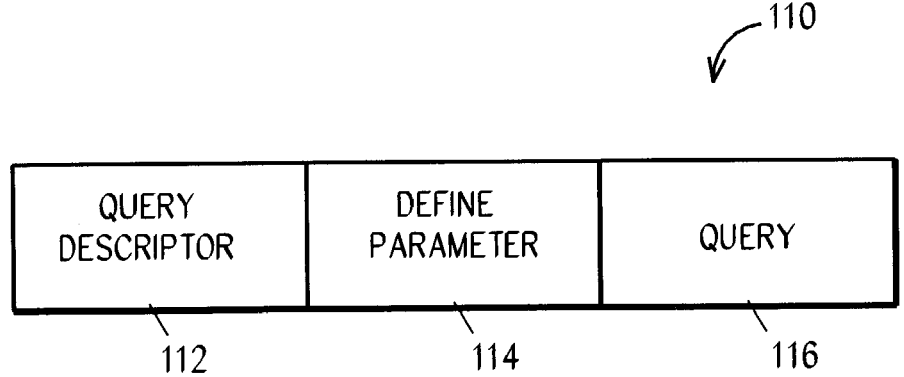
FIG. 4 is a diagrammatic representation of the XML format for wrapping SQL queries.

Referring to FIG. 4, the SQL queries 21 that are responsible for extraction and data-mining are wrapped in a result set XML format having a schema (or structure) 110 that provides three main tag elements defining how the SQL queries are executed. These tag elements are <queryDescriptor> 112, <defineparameter> 114, and <query> 116.

The <queryDescriptor> element 112 represents the root of the XML document and provides an alias attribute to describe the context of the query. This <queryDescriptor> element 112 is derived from http request 23 by request handler 40 and fed to query engine 42 as is represented by line 41.

The <defineParameter> element 114 defines the necessary parameters needed to construct dynamic SQL queries 21 to perform conditional logic on metrics database 32. The parameters are set through its attributes (localname, requestParameter, and defaultValue). The actual parameter to be looked up is requestParameter. The localname represents the local alias that refers to the value of requestParameter. The defaultValue is the default parameter value.

QRML structure 116 includes <query> element 116 containing the query definition. There can be one or more <query> elements 116 depending on the need for multiple query executions. A <data> child node element is used to wrap the actual query through its corresponding child nodes. The three essential child nodes of <data> are <queryComponent>, <useParameter>, and <queryAsFullyQualified>. The <queryComponent> element wraps the main segment of the SQL query. The <useParameter> element allows parameters to be plugged into the query as described in <defineParameter>. The <queryAsFullyQualified> element is used in the case where the SQL query 21 needs to return an unfiltered set of data.

When a user at client browser 24 selects a metric to visualize, the name of an XML document is passed as a parameter in HTTP request 23 to servlet 34 as follows:

<input type=hidden
name="queryAlias"value="AffinityPerCategory">

In some cases, there is a need to utilize another method for extracting data from the data source 32 through the use of a generator Java bean. The name of this generator bean is passed as a parameter in HTTP request 23 to servlet 34 as follows:

<input type=hidden
name="queryAlias"value="PeopleInCommonBy
CommGenerator">

Once servlet 34 receives the XML document name or the appropriate generator bean reference at request handler 40, query engine 42 filters, processes, and executes query 21. Once query 21 is executed, data returned from metrics database 32 on line 21 is normalized by query engine 42 into an XML format 43 that can be intelligently processed by an XSL style sheet 52 further on in the process.

Figure 5:
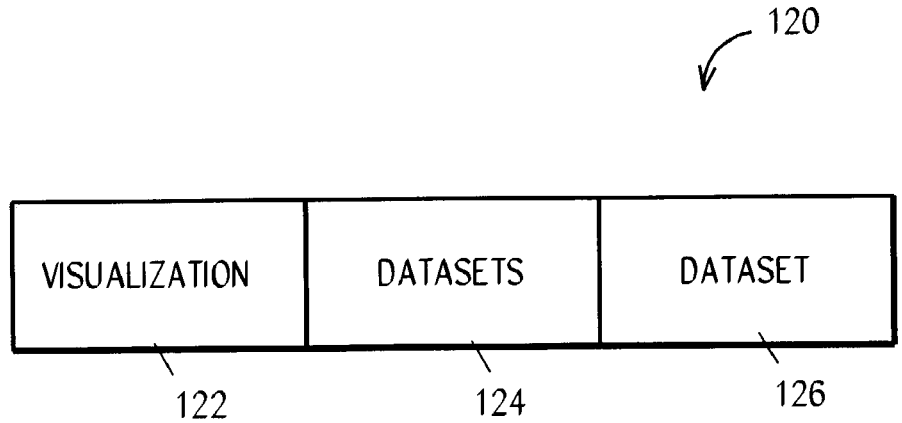
FIG. 5 is a diagrammatic representation of a normalized XML format, or QRML.

Referring to FIG. 5, the response back to web application server 22 placed on line 21 is classified as a Query Response Markup Language (QRML) 120. QRML 120 is composed of three main elements. They are <visualization> 122, <datasets> 124, and <dataset> 126. QRML structure 120 describes XML query descriptions 48 and the construction of a result set XML on line 43.

The <visualization> element 122 represents the root of the XML document 43 and provides an alias attribute to describe the tool used for visualization, such as a chart applet, for response 25.

The <datasets> element 124 wraps one or more <dataset> collections depending on whether multiple query executions are used.

The <dataset> element 126 is composed of a child node <member> that contains an attribute to index each row of returned data. To wrap the raw data itself, the <member> element has a child node <elem> to correspond to column data.

Data Translation and Visualization

Referring further to FIG. 3, for data translation and visualization, in accordance with the architecture of an exemplary embodiment of the invention, an effective delineation between the visual components (interface) and the data extraction layers (implementation) is provided by visualization engine 44 receiving notification from query engine 42 and commanding how the user interface response on line 25 should be constructed or appear. In order to glue the interface to the implementation, embedded JSP scripting logic 50 is used to generate the visualizations on the client side 25. This process is two-fold. Once servlet 34 extracts and normalizes the data source 32 into the appropriate XML structure 43, the resulting document node is then dispatched to the receiving JSP 50. Essentially, all of the data packaging is performed before it reaches the client side 25 for visualization. The page is selected by the value parameter of a user HTTP request, which is an identifier for the appropriate JSP file 50. Layout pages 50 receive the result set XML 120 on line 43, and once received an XSL transform takes effect that executes a transformation to produce parameters necessary to launch the visualization.

For a visualization to occur at client 24, a specific set of parameters needs to be passed to the chart applet provided by, for example, Visual Mining's Netcharts solution. XSL transformation 52 generates the necessary Chart Definition Language (CDLs) parameters, a format used to specify data parameters and chart properties. Other visualizations may involve only HTML (for example, as when a table of information is displayed).

An XSL style sheet (or transform) 52 is used to translate the QRML document on line 43 into the specific CDL format shown above on line 25.

This process of data retrieval, binding, and translation all occur within a JSP page 50. An XSLT Bean opens an XSL file 52 and applies it to the XML 43 that represents the results of the SQL query. (This XML is retrieved by calling queryResp.getDocumentElement( )). The final result of executing this JSP 50 is that a HTML page 25 is sent to browser 24. This HTML page will include, if necessary, a tag that runs a charting applet (and provides that applet with the parameters and data it needs to display correctly). In simple cases, the HTML page includes only HTML tags (for example, as in the case where a simple table is displayed at browser 24). This use of XSL and XML within a JSP is a well-known Java development practice.

Ser. No. 10/286,211 filed 31 Oct. 2002 for "SYSTEM AND METHOD FOR DETERMINING FOUNDERS OF AN INFORMATION AGGREGATE", Table 1 illustrates an example of XML structure 110; Table 2 illustrates an example of the normalized XML, or QRML, structure; Table 3 illustrates an example of CDL defined parameters fed to client 24 on line 25 from visualization engine 44; Table 4 illustrates an example of how an XSL style sheet 52 defines translation; and Table 5 is script illustrating how pre-packaged document node 43 is retrieved and how an XSL transformation 52 is called to generate the visualization parameters.

An exemplary embodiment of the system and method of the invention may be built using the Java programming language on the Jakarta Tomcat platform (v3.2.3) using the Model-View-Controller (MVC) (also known as Model 2) architecture to separate the data model from the view mechanism.

Information Aggregate

Figure 6:
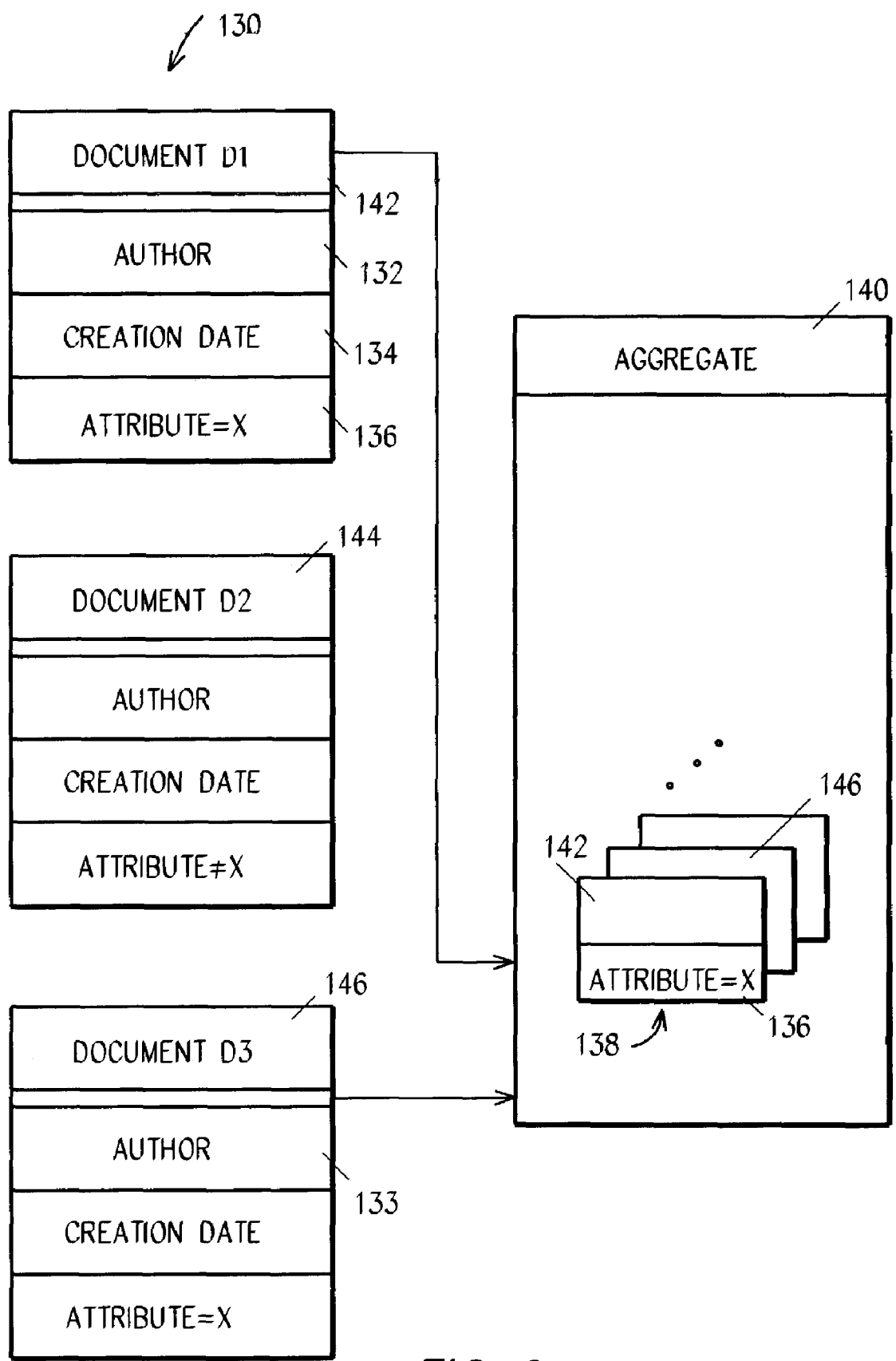
FIG. 6 is a diagrammatic representation of an aggregate in accordance with the preferred embodiment of the invention.

Referring to FIG. 6, a system in accordance with the present invention contains documents 130 such as Web pages, records in Notes databases, and e-mails. Each document 130 is associated with its author 132, and the date of its creation 134. A collection of selected documents 130 forms an aggregates 140. An aggregate 140 is a collection 138 of documents 142, 146 having a shared attribute 136 having non-unique values. Documents 138 can be aggregated by attributes 136 such as:

Category—a collection of documents 130 about a specific topic, a logical organization of knowledge resources based on similarities in content or focus, or due to the manner in which a group utilizes them.

Community—a collection of documents 130 of interest to a given group of people. This type of collection can be formed by identifying a set of knowledge repositories used by a community or team, and then forming the collection from the union of documents contained in the specified repositories. A community is a group of persons with a common interest, goal, or focus who communicate through some means over a period of time in an effort to further their individual and collective knowledge about that interest.

Location—a collection of documents 130 authored by people in a geographic location (e.g. USA, Utah, Massachusetts, Europe).

Job function or role—a collection of documents 130 authored by people in particular job roles (e.g. Marketing, Development).

Group (where group is a list of people)—a collection of documents authored by a given set of people.

Any other attributed 136 shared by a group (and having non-unique values).

Figure 7:
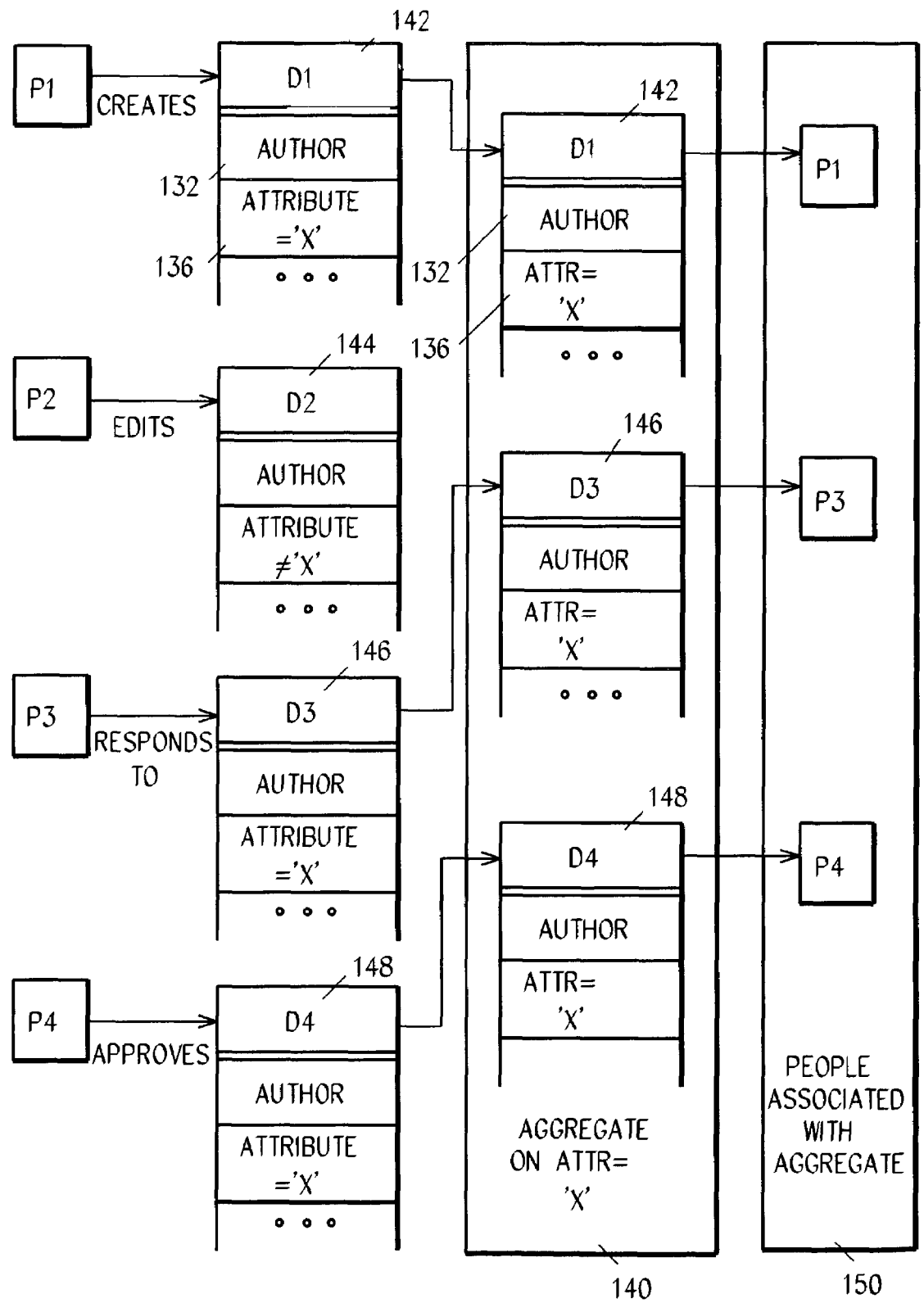
FIG. 7 is a diagrammatic illustration of people associated with an aggregate.

Referring to FIG. 7, people may be associated with an aggregate in several ways. For example, person P1 is associated with document D1 as its creator, person P2 is associated with document D2 as its editor, person P3 is associated with document 146 as a responder, and person P4 is associated with document 148 as its approver. Aggregate 140 on attribute X includes documents 142, 146, and 148, and therefore people 150 associated with aggregate 140 include persons P1, P3 and P4.

Overlap for Information Aggregates

Figure 8:
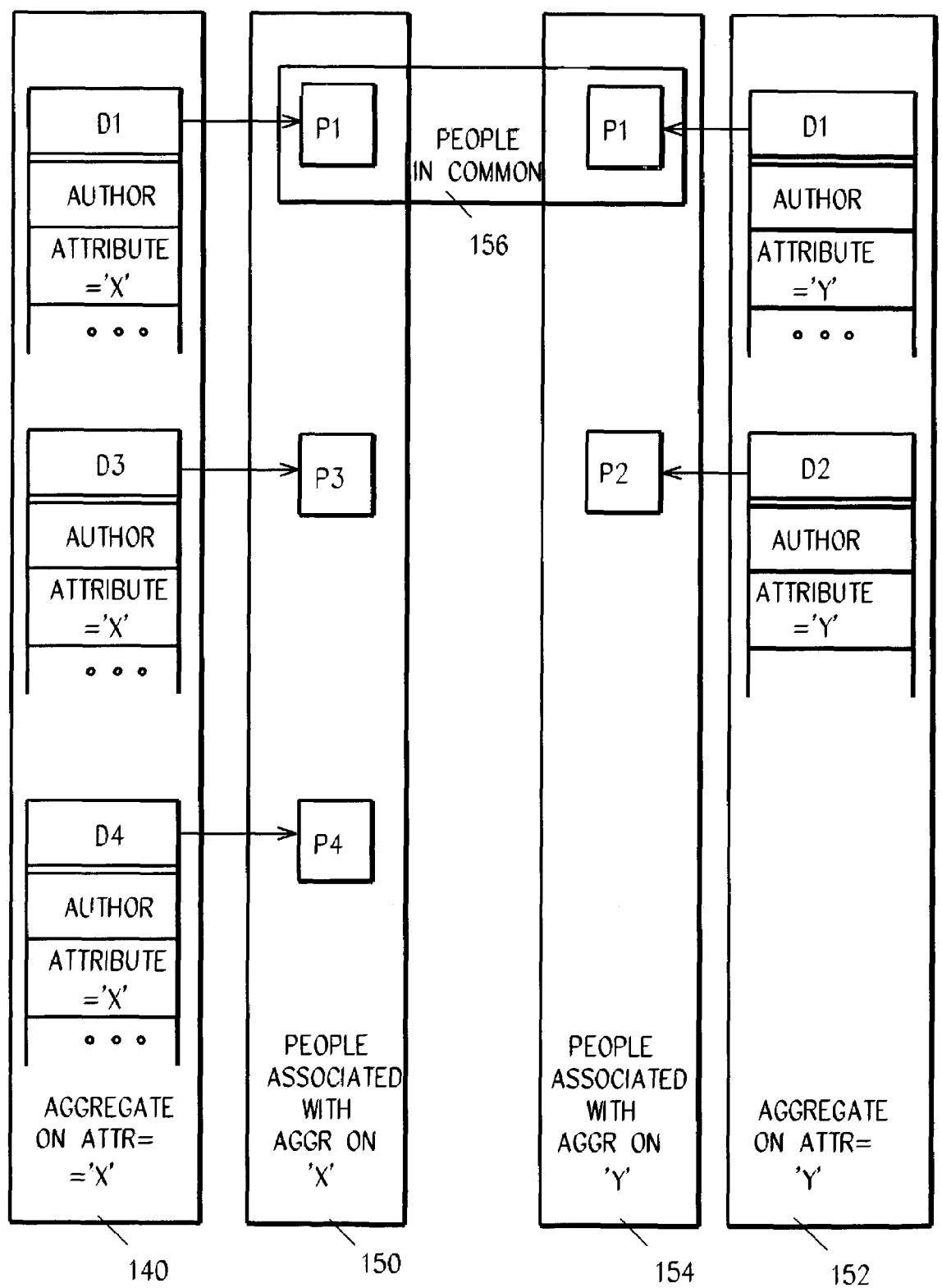
FIG. 8 is a diagrammatic illustration of people associated in common with a plurality of aggregates.

Referring to FIG. 8, people may associated in common with a plurality of aggregates. In this case, person P1 is associated with document D1 in aggregate 152 on attribute Y, and person P2 with document D2 in aggregate Y. As in FIG. 7, person D1 is also associated with document D1 in aggregate 140 on attribute X. Therefore, people in common 156 includes person P1. In a similar manner, usage patterns, documents and categories common to aggregates 150, 152 may be determined.

In accordance with the preferred embodiment of the invention, the amount of overlap between two specified communities is determined and displayed. A community is a specific type of aggregate, and the present invention applies to any type of information aggregate.

A knowledge resource is an entity, either physical or virtual, from which knowledge may be acquired, learned, derived or otherwise obtained by a person or set of persons. Examples include (but are not limited to) a text document, a QuickPlace, a multimedia presentation, a website, a newsgroup, a public email or memo.

Figure 9:
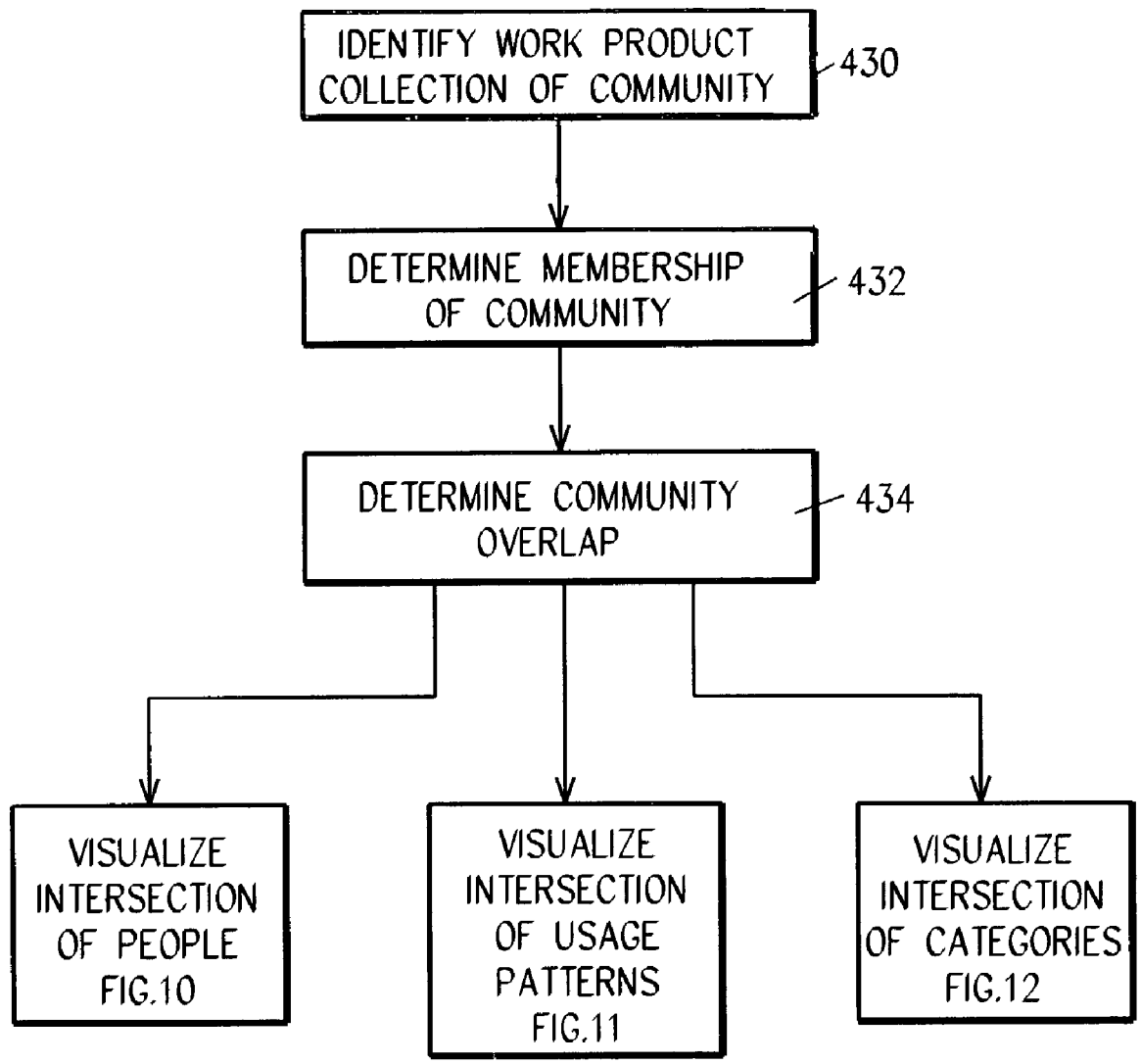
FIG. 9 is a flow chart illustrating the determination and visualization of community overlap.

Referring to FIG. 9, in step 430 a collection of knowledge resources that is of particular interest to a group of people, or that represents the work products of that group, is identified. For example, a group of electronic documents that are produced by a team are often stored in a well-known database. Several such databases may be employed in the work of a complex team, and the union of electronic documents across a collection of such databases can then be taken as representative of the team. Specific examples of mechanisms for grouping documents in this way include Notes databases, Quick places, tables in relational databases, Web sites, and news groups.

In step 432, the membership of the community is determined. The collection of knowledge resources resulting from step 430 is taken as representative of a group of people (a community). The membership of the community is determined by looking at user activity around the knowledge resources over a specified time period. The membership of the community is then the union of people who have, over the specified time period authored a knowledge resource, accessed a knowledge resource (e.g. read or opened it), modified a knowledge resource, responded to a knowledge resource (e.g. in a threaded discussion), forwarded a knowledge resource (e.g. through e-mail), bookmarked a knowledge resource, or created a new knowledge resource that contains a link (or reference) to a knowledge resource in the collection.

Steps 430 and 432 may be repeated for each of a plurality of communities, or other information aggregates. In step 434, the overlap between these communities or information aggregates is determined.

Figure 10:
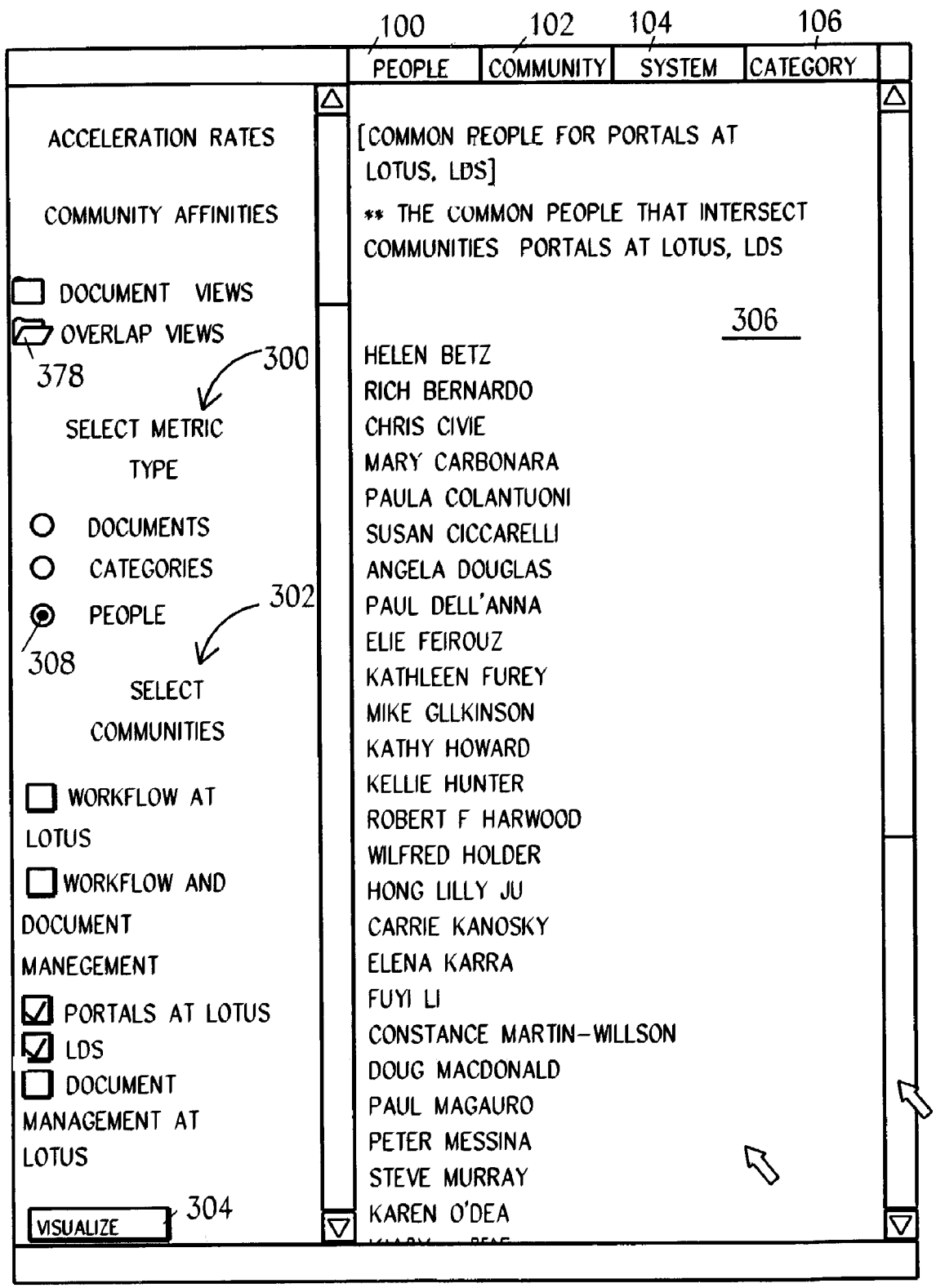
FIG. 10 is diagrammatic illustration of a visualization of community intersection with respect to people.
Figure 11:
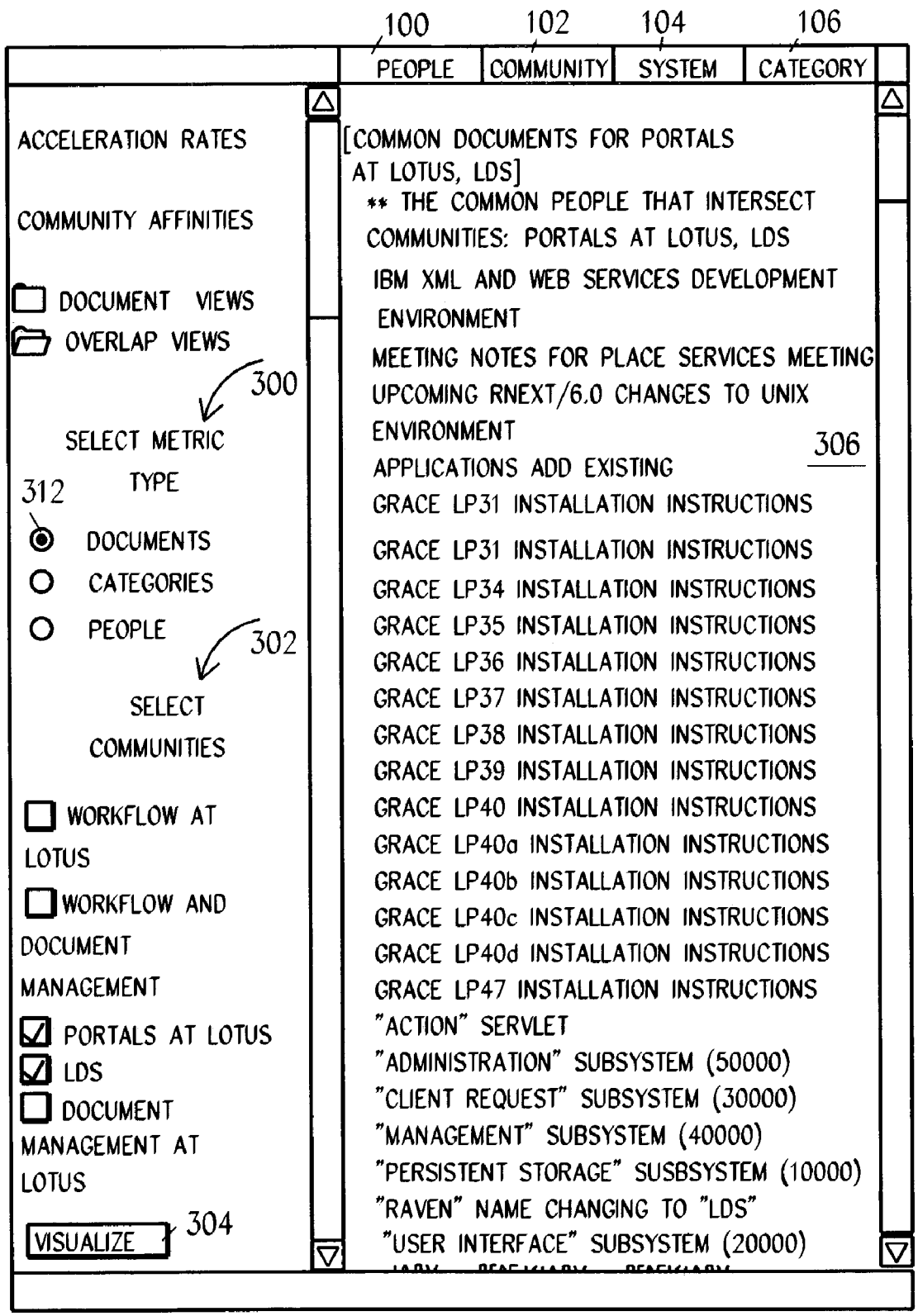
FIG. 11 is a diagrammatic illustration of a visualization of community intersection with respect to usage patterns.

Referring to FIGS. 10-12, on an abstract level, community overlap can occur in at least three dimensions. In the display of FIGS. 10-12, with community domain 102 selected from among domains 100-106, and with overlap views 378 selected, two or more communities 302 selected, a user selects metric type people 308, categories 310, or documents 312, and then visualize 304 to display intersection material in window 306.

1. FIG. 10 illustrates in window 306 the intersection of people within a set of communities. This intersection represents people who are considered members by both communities. When two communities are closely related, these individuals can provide valuable insights to each of the communities they participate in due to their exposure to the other semi-disjoint community.

2. FIG. 11 illustrates in window 306 the intersection of the usage patterns or documents of shared knowledge resources within a community. This focuses on the actual knowledge resources utilized by all communities; items such as text documents, QuickPlaces, or multimedia presentations. For example, this intersection can identify the documents that are used across communities. Documents that are used widely are likely to be more valuable.

3. FIG. 12 illustrates in window 306 the intersection of the categories used by a set of communities. On the next level, logical organizations of knowledge resources based on how they are used by communities may be determined. For example, in a system where documents are organized into categories, the categories that two communities have in common may be determined. Such shared categories represent globally valuable information, and potentially represent points of high leverage for managers designing organizational interventions (such as training courses).

Community overlap views may be implemented in the context of the Lotus Discovery Server. The Lotus Discovery Server is a system that supports the collection of documents into information aggregates. The aggregates supported by the Discovery Server are categories and communities. A category is a collection of documents that are concerned with the same topic and can be organized hierarchically. A community is modeled as a collection of documents that are of interest to a particular group of people. The Discovery Server allows a community to be defined based on the information repositories used by the community.

Advantages Over the Prior Art

It is an advantage of the invention that there is provided an improved system and method for evaluating relationships between information aggregates.

It is a further advantage of the invention that there is provided a system and method for determining and visualizing intersections of information aggregates.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A computer implemented method for evaluating a plurality of document collections, comprising:
   collecting a plurality of documents having non-unique values on a first shared attribute into a first document collection;
   collecting a plurality of documents having non-unique values on a second shared attribute into a second document collection;
   collecting a plurality of documents having non-unique values on at least one additional shared attribute into at least one additional document collection;
   each said document collection including electronic documents stored in a document management system where each said document is accessible to a plurality of individuals;
   said attributes being selected from a group of attributes including category and community; a category being a collection of documents about a specific topic, and a community being a collection of documents of interest to a specific group of people;
   determining and visualizing intersections of said first, second, and any additional document collections;
   for said communities, said visualizing including:
      providing to a user interface of a computer apparatus user selectable buttons for selecting at least two designated communities and one metric type from a set of metric types including documents metric, categories metric, and people metric;
      responsive to user selection of said people metric, presenting at said user interface a display of common people that intersect said designated communities;
      responsive to user selection of said documents metric, presenting to said user interface a display of common documents that intersect said designated communities; and
      responsive to user selection of said categories metric, presenting to said user interface a display of common categories that intersect said designated communities.

2. The method of claim 1, said intersection being of people who interact with documents in said document collection.

3. The method of claim 1, said intersections being communities.

4. A computer system for evaluating a document collection, comprising:
   means for collecting a plurality of documents having non-unique values on a first shared attribute into a first document collection;
   means for collecting a plurality of documents having non-unique values on a second shared attribute into a second document collection;
   means for collecting a plurality of documents having non-unique values on at least one additional shared attribute into at least one additional document collection;
   said attributes being selected from a group of attributes including category and community; a category being a collection of documents about a specific topic, and a community being a collection of documents of interest to a specific group of people;
   each said document collection consisting of electronic documents stored in a document management system where each said document is a public document accessible to a plurality of individuals;
   means for determining and visualizing intersections of said first and second document collections;
   for said communities, said visualizing including:
      providing to a user interface of a computer apparatus user selectable buttons for selecting at least two designated communities and one metric type from a set of metric types including documents metric, categories metric, and people metric;
      responsive to user selection of said people metric, presenting at said user interface a display of common people that intersect said designated communities;

responsive to user selection of said documents metric, presenting to said user interface a display of common documents that intersect said designated communities; and responsive to user selection of said categories metric, presenting to said user interface a display of common categories that intersect said designated communities.

5. A computer system for evaluating a document collection, comprising:
a metrics database for storing document indicia including document attributes, associated persons and age of creation;
a query engine responsive to a user request and said metrics database for aggregating documents having same, unique attributes in a document collection;
said query engine further for
collecting a plurality of documents having non-unique values on a first shared attribute into a first document collection;
collecting a plurality of documents having non-unique values on a second shared attribute into a second document collection;
collecting a plurality of documents having non-unique values on at least one additional shared attribute into at least one additional document collection;
said attributes being selected from a group of attributes including category and community; a category being a collection of documents about a specific topic, and a community being a collection of documents of interest to a specific group of people;
each said document collection including electronic documents stored in a document management system where each said document is a public document accessible to a plurality of individuals;
a visualization engine for visualizing intersections of said first and second and any additional document collections;
for said communities, said visualizing including:
providing to a user interface of a computer apparatus user selectable buttons for selecting at least two designated communities and one metric type from a set of metric types including documents metric, categories metric, and people metric;
responsive to user selection of said people metric, presenting at said user interface a display of common people that intersect said designated communities;
responsive to user selection of said documents metric, presenting to said user interface a display of common documents that intersect said designated communities; and
responsive to user selection of said categories metric, presenting to said user interface a display of common categories that intersect said designated communities.

6. The system of claim 5, said intersections of document collections comprising communities.

7. The system of claim 6, said visualization further selectively displaying intersections of people who interact with documents in said document collections.

8. A program storage device readable by a machine, tangibly embodying a program of instructions executable by a machine to perform method steps for evaluating document collections, said method comprising:
collecting a plurality of documents having non-unique values on a first shared attribute into a first document collection;
collecting a plurality of documents having non-unique values on a second shared attribute into a document collection;
collecting a plurality of documents having non-unique values on at least one additional shared attribute into at least one additional document collection;
said attributes being selected from a group of attributes including category and community; a category being a collection of documents about a specific tonic, and a community being a collection of documents of interest to a specific group of people;
each said document collection including electronic documents stored in a document management system where each said document is a public document accessible to a plurality of individuals;
determining and visualizing intersections with said first, second, and any additional document collections;
for said communities, said visualizing including:
providing to a user interface of a computer apparatus user selectable buttons for selecting at least two designated communities and one metric type from a set of metric types including documents metric, categories metric, and people metric;
responsive to user selection of said people metric, presenting at said user interface a display of common people that intersect said designated communities;
responsive to user selection of said documents metric, presenting to said user interface a display of common documents that intersect said designated communities; and
responsive to user selection of said categories metric, presenting to said user interface a display of common categories that intersect said designated communities.

9. A computer program product for evaluating an document collection according to the method comprising:
collecting a plurality of documents having non-unique values on a first shared attribute into a first document collection;
collecting a plurality of documents having non-unique values on a second shared attribute into a second document collection;
collecting a plurality of documents having non-unique values on at least one additional shared attribute into at least one additional document collection;
said attributes being selected from a group of attributes including category and community; a category being a collection of documents about a specific topic, and a community being a collection of documents of interest to a specific group of people;
each said document collection including electronic documents stored in a document management o system where each said document is accessible to a plurality of individuals;
selectively identifying and visualizing intersections with documents in said first, second, and additional document collections;
for said communities, said visualizing including:
providing to a user interface of a computer apparatus user selectable buttons for selecting at least two designated communities and one metric type from a set of metric types including documents metric, categories metric, and people metric;

responsive to user selection of said people metric, presenting at said user interface a display of common people that intersect said designated communities;

responsive to user selection of said documents metric, presenting to said user interface a display of common documents that intersect said designated communities; and responsive to user selection of said categories metric, presenting to said user interface a display of common categories that intersect said designated communities.

* * * * *